(12) United States Patent
Czerwonka (10) Patent No.: US 7,293,257 B2
(45) Date of Patent: Nov. 6, 2007

(54) METHOD AND SYSTEM FOR EFFICIENT TESTING OF SEQUENCES OF COMPUTER-RELATED OPERATIONS

(75) Inventor: Jacek A. Czerwonka, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 719 days.

(21) Appl. No.: 10/686,418

(22) Filed: Oct. 14, 2003

(65) Prior Publication Data

US 2005/0081109 A1  Apr. 14, 2005

(51) Int. Cl.
    G06F 9/44  (2006.01)
(52) U.S. Cl. .................. 717/124; 717/106; 714/38
(58) Field of Classification Search ......... 717/124–130
    See application file for complete search history.

(56) References Cited

U.S. PATENT DOCUMENTS

| | | | | |
|---|---|---|---|---|
| 6,088,664 A | * | 7/2000 | MacPherson | 702/183 |
| 6,321,376 B1 | * | 11/2001 | Willis et al. | 717/124 |
| 2004/0088677 A1 | * | 5/2004 | Williams | 717/104 |

OTHER PUBLICATIONS

A UML-Based Approach to System Testing. Lional Briand, Y van Labiche. Software Quality Engineering Laboratory, Systems and Computer Engineering Department, Carleton University. Sep. 12, 2002, pp. 10-42.*

Test Sequence Generation Scheme Satisfying the Completeness Criteria. HongSe Son, DaeHun Nyang, JinHo Park, SangYong Lim, ByungMoon Chin, JunWon Lee, and JooSeok Song. IEEE, Mar. 1997, pp. 560-563.*

Testing Combinations of Parameters Made Easy. Gregory T. Daich IEEE, Software Technology Support Center (STSC), Science Applications Inteniational Corporation (SAIC). Jul. 2003, pp. 379-384.*

* cited by examiner

Primary Examiner—Tuan Dam
Assistant Examiner—Chuck Kendall
(74) Attorney, Agent, or Firm—Workman Nydegger (57) ABSTRACT

A system and method for testing sequences of computer-related operations by using subsequences of operations of a given length. The subsequences are used to construct a suite of test cases that reduces the number of testing permutations while satisfying desired testing requirements. A mechanism generates test cases by listing the possible subsequences of a specified length, from which a subsequence is chosen to start a test case, and marked as covered. A selection algorithm may be used to choose a subsequence, such as based on a count of the number of subsequence elements starting still uncovered subsequences. Subsequences are added to the test case until a specified maximum length, with a preference for selecting uncovered subsequences. The process continues adding test cases until no subsequence remains uncovered. The resultant set of test cases is processed based on any specified constraints and preconditions, to produce a final suite of test cases.

22 Claims, 7 Drawing Sheets

METHOD AND SYSTEM FOR EFFICIENT TESTING OF SEQUENCES OF COMPUTER-RELATED OPERATIONS

FIELD OF THE INVENTION

The invention relates generally to computer systems, and more particularly to testing computer-related operations.

BACKGROUND OF THE INVENTION

Since the beginning of computer programming, bugs have been present in software. Given enough users of a program, bugs will be found, which reflect poorly on the software vendor. Thus, an important part of software development is testing to eliminate bugs in software, and to have the software designed to otherwise handle unusual circumstances. That is one reason why Beta testing is used, so that by sheer numbers, many users (who understand that bugs are likely early in the development process) can help to debug a product before it is sold to consumers. Other testing is performed in a black-box type environment, in which testers intentionally run software through numerous combinations and permutations, looking for bugs.

Some bugs and other computer-related problems are not necessarily a result of programming errors, but instead result from a combination of events that occur in a certain order. For example, one common test scenario that follows such an order-dependent pattern is the installation of software packages. In general, applications may require that a specific version of a runtime (e.g., managed execution) environment be present, and/or that runtime environments be installed in a certain order. Thus, in certain scenarios, testers need to test sequences of operations in which the order of those operations is important. Consider four versions of a runtime environment, such as versions A, B, C, and D in this example. An application may be compiled against any of these and may work only if a specific version of the runtime environment is installed. Further, installing such runtime environment one after another needs to provide a stable environment. Thus, A, B, C, D may be a valid installation order, but installing in the order A, C, B, D may cause instability.

A typical test requires that all possible permutations of the runtime environments be installed, and after each installation step, the attempts to run a set of one or more applications, (which were compiled with different versions of the runtime environment), verifying whether the applications work (or do not work) as expected. To exhaustively test four independent operations such as installations (represented by elements) A, B, C, D in which the order of installations matters, a tester needs to run through twenty-four permutations of the installations, as in the following table:

| |
|---|
| {A, B, C, D} |
| {B, A, C, D} |
| {C, A, B, D} |
| {D, A, B, C} |
| {A, B, D, C} |
| {B, A, D, C} |
| {C, A, D, B} |
| {D, A, C, B} |
| {A, C, B, D} |
| {B, C, A, D} |
| {C, B, A, D} |
| {D, B, A, C} |

-continued

| |
|---|
| {A, C, D, B} |
| {B, C, D, A} |
| {C, B, D, A} |
| {D, B, C, A} |
| {A, D, B, C} |
| {B, D, A, C} |
| {C, D, A, B} |
| {D, C, A, B} |
| {A, D, C, B} |
| {B, D, C, A} |
| {C, D, B, A} |
| {D, C, B, A} |

Although this is not exceptionally difficult given the number of versions in the simple example above, adding one new element to the set of operations makes the test suite grow by a factor of five, that is, 120 tests. The size of the test suite for n elements is n factorial (n!), which quickly becomes unworkable in many situations with many elements, particularly when each element in a test case corresponds to a somewhat time-consuming operation, such as performing a software package installation. Simply selecting certain test cases and not others would likely leave important sequences of operations untested, providing an unreliable test.

What is needed is a way to provide a test suite that has a reduced number of test cases corresponding to sequences of computer-related operations. At the same time, any such reduction of test cases cannot cause important test sequences to be missed.

SUMMARY OF THE INVENTION

Briefly, the present invention provides a system and method for testing sequences of computer-related operations using subsequences of operations of a given length (e.g., as specified by a tester), in a manner that reduces the number of permutations, yet covers desired testing requirements in most situations. For example, instead of testing all permutations of four operations, all permutations of two operation subsequences may be tested, thereby significantly reducing the number of tests required, yet still ensuring that each operation is tested after each other operation at least once. Note that as used herein, an "element" of a test represents any computer-related operation, wherein an operation may be considered to be any atomic action that can be executed on the domain under test. Thus, a test case that tests three operations in sequence can be represented by elements A, B and C, and tested via subsequences (A,B), (B,A), (A,C), (C,A), (B,C) and (C,B).

In general, the system and method of the present invention provides a mechanism that generates a suite of test cases by constructing a list of the possible subsequences of a specified length. When constraints are also specified, such as for combination which are known (e.g., deemed by the tester) to be invalid, any subsequences corresponding to those constraints are removed from the list. The mechanism then performs a process to construct test cases from the remaining subsequences in the list, until each subsequence is covered at least once in a test case.

In one implementation, the list is in the form of subsequences of elements, and an element from the list is then selected to start a test case based on a suitable selection algorithm. For example, the element chosen to start the test case may be the one corresponding to a count of the largest number of elements starting still uncovered subsequences, or if a tie, the first available element. A subsequence starting with that element is then added to the test case, and marked as covered. Subsequences are added to the test case until a specified maximum length is reached, with a preference for selecting uncovered subsequences when available and appropriate for the test case. When the test case is at a point in which no more subsequences can be added to it without exceeding the maximum length, a new test case is started. The process repeats with one or more new test cases until no subsequence remains uncovered. At this time a resultant set of test cases has been produced.

Constraints and preconditions may also be applied to the resultant set of test cases. For example, if a constraint (such as specified by the tester) expects a failure in a subsequence of operations, and that failure would prevent further subsequences in the test case from being tested, then the test case is split into multiple test cases such that the further subsequences are tested in a separate test case. Preconditions, such as specified by the tester, are also handled by the testing mechanism, such as to split certain test cases such that one test tests without the precondition satisfied and one test that satisfies the precondition and continues testing.

Following construction of the test cases and any post-construction constraint and precondition processing on the resultant set, a final suite of test cases is produced. This final suite is then output, such as for performing the tests, or stored for later use.

Other advantages will become apparent from the following detailed description when taken in conjunction with the drawings, in which:

DETAILED DESCRIPTION

Exemplary Operating Environment

Figure 1:
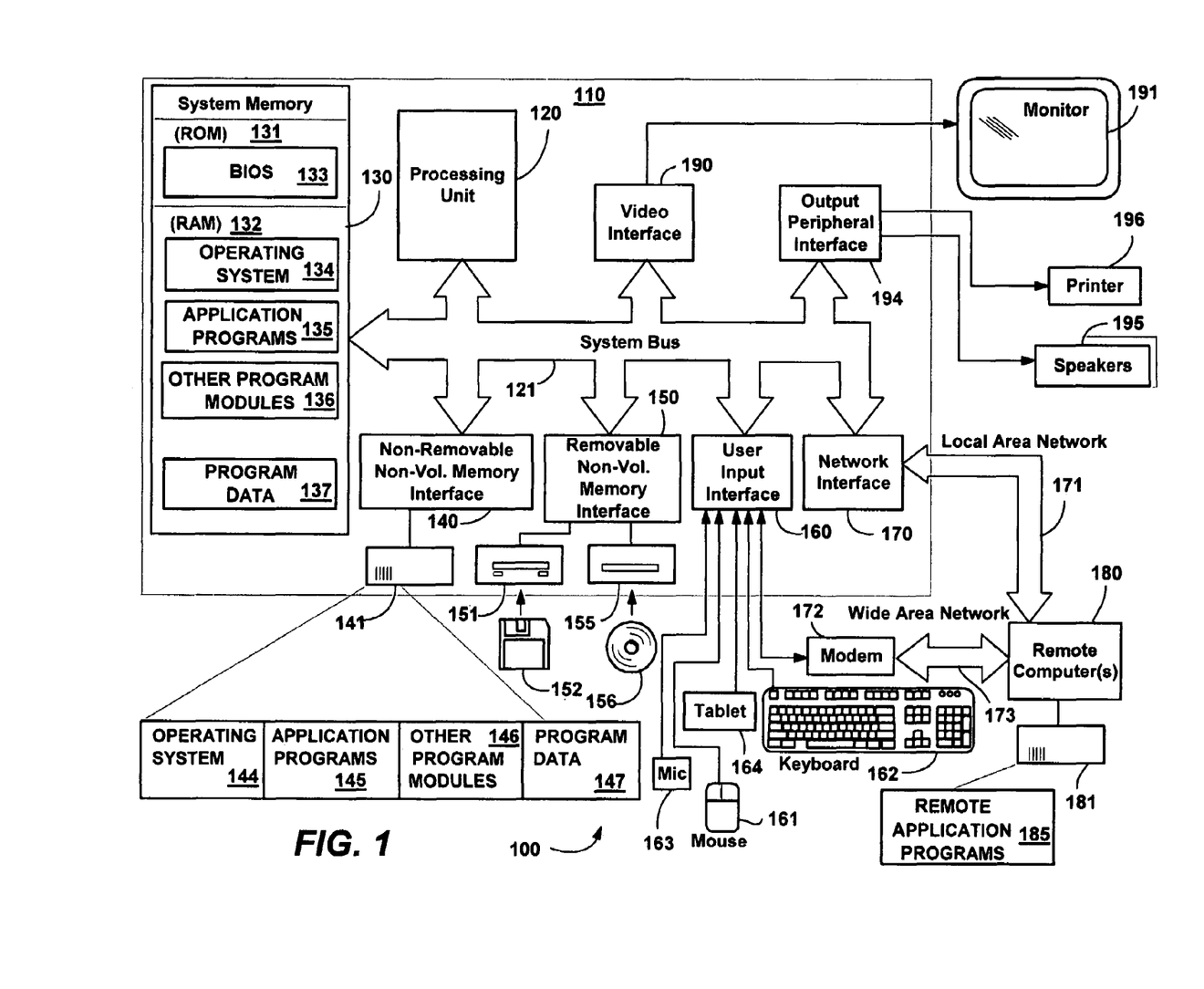
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Efficient Test Suite Generation

The present invention is, in part, directed towards choosing an appropriate set of test cases from subsequences of computer-related operations, each of which are typically some atomic action performed in a computing environment, such as to format a storage volume, install a set of at least one program and/or components, patch a program, change some text's font characteristic (e.g., italicize it), and so forth. In general, the present invention tests such operations in various orders, to ensure that the order of performing operations does not cause a failure when it should not, or properly handles failures when an order of operations is expected to fail. Notwithstanding, it should be understood that the present invention is not limited to the example operations herein, but rather provides numerous benefits in computing generally.

Thus, as used herein, an operation is typically an atomic action that can be executed on the domain under test. Note however that an operation can actually be made up of multiple sub-operations, e.g., opening a dialog box, receiving some input via that dialog box and closing the dialog box can be considered to be a single atomic operation from the perspective of a test case. An "element" of a test represents any computer-related operation.

By way of example, consider a set of four elements, A, B. C, and D, each of which represents an operation that is to be tested. In keeping with an aspect of the invention, these test elements will be tested in various test case sequences, made up of subsequences. In a straightforward, but still non-trivial case in which elements are to be tested in subsequences comprising pairs (a test having a specified subsequence length, or L, =2), the following table lists the twelve subsequences that made from two non-duplicated elements chosen from a four-element set:
(A,B), (B,A), (A,C), (C,A), (A,D), (D,A)
(B,C), (C,B), (B,D), (D,B), (C,D), (D,C)

Note that these subsequences may be combined in longer test cases that can be of any arbitrary length, that is, test cases of two, three, or four elements in length (without the same element appearing more than once in a test case), or any number greater than two if an element can appear more than once in a test case, as constrained only by what subsequences can be put together. For example, a test case sequence comprising {A,B,C,A,D,B,A} is possible. In the present example, each element is desired only once per test case, and thus with four elements, the maximum length cannot exceed four as. Four element test cases are set forth in the test sequences below:

{A,B,C,D}, {B,D,A,C}, {C,A,D,B}, {D,C,B,A}

As will be understood, this suite of test cases (or test sequences) covers the twelve possible sequence pairings listed above, as test sequence {A,B,C,D} covers (A,B), (B,C) and (C,D); test sequence {B,D,A,C} covers (B,D), (D,A) and (A,C); test sequence {C,A,D,B} covers (C,A), (A,D) and (D,B); and test sequences {D,C,B,A} covers (D,C), (C,B) and (B,A). These four test cases are substantially less in number than the twenty-four test cases needed in exhaustive testing, and thus consume substantially less testing resources.

In accordance with an aspect of the present invention, there is provided a mechanism and architecture to generate such a test suite having a reduced number of tests, and that meet the operation sequence testing requirements specified by a testing entity, such as a tester. Note that in one implementation, unlike the above example the mechanism does not always generate an ideal test suite, e.g., there may be some repeated subsequences in a later test set, and the maximum number of elements may not always be present in a test case. However the mechanism substantially reduces the number of tests needed to thoroughly test a sequence of operations relative to the number of tests required to exhaustively test the sequence of operations, which in the example above was four test cases instead of twenty-four. As can be readily appreciated, even more dramatic gains can be accomplished with the present invention, particularly with more complex domains, which are impractical to exhaustively test.

Figure 2:
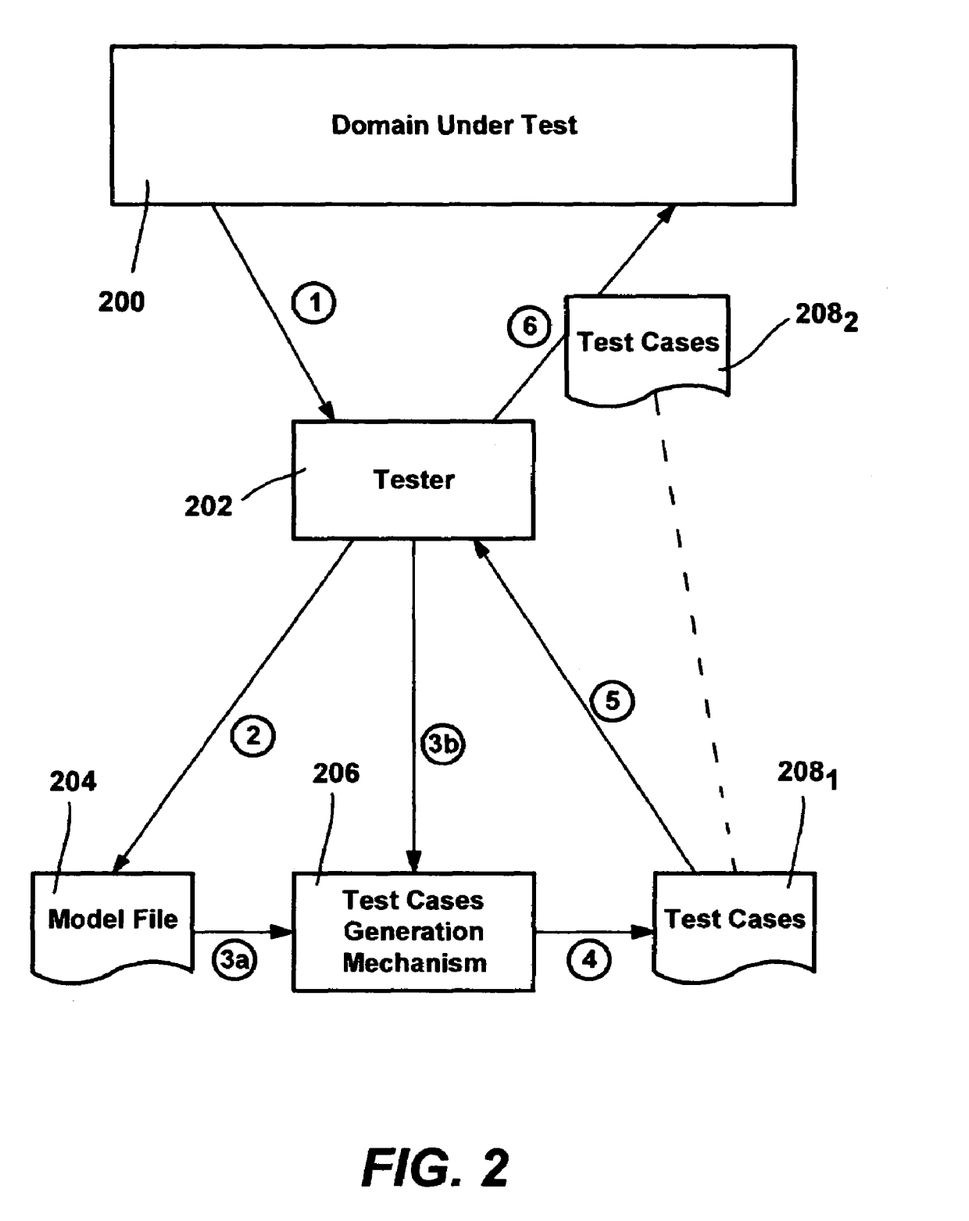
FIG. 2 is a block diagram generally representing an example test suite generation architecture used to generate an efficient test suite of test cases for testing sequences of operations, in accordance with an aspect of the present invention.

FIG. 2 shows a general architecture for generating the sequences of test elements (test cases) in this manner. The test cases, which together can be thought of as a test suite, are used for testing a domain under test 200, such as the software packages described above, or any appropriate domain. In general, a tester (e.g., a person or process) 202 produces a model 204 that may be maintained in one or more files and which reflects the characteristics of the domain-under-test 200. The model 204 generally includes a set of parameters and values for those parameters, such as whether to test subsequences in pairs, triplets and so on, the maximum number of elements per test case, and other variable values described herein. In general, the tester may review the software package and determine the parameters and values to test, and/or the software package developer may provide a list of parameters and/or values to test along with version information or the like. The creation of the model is represented in FIG. 2 by the arrows labeled with circled numerals (1) and (2).

In addition to the parameters and values for those parameters, the model may include a set of constraints (also referred to as exclusions) and preconditions that identify various exceptions regarding sequences. For example, certain sequences of operations are expected to fail, and this failure should not result in other sequences in the same test case not being tested. Certain sequences may be identified as sequences which should not be tested. Note that the sets of constraints and preconditions may be empty in a given model.

As further represented in FIG. 2, the model (file) 204 is provided (represented by the arrow labeled 3a) as an input to a test case generation mechanism 206, an example one of which may be based on an algorithm comprising one or more processes as described below with reference to FIGS. 4-7. As represented by the arrow labeled 3b, the test case generation mechanism 206 may also receive information (e.g., from the tester 202) as to what length (combinations) of subsequences should be should be covered, that is, whether pairs (L=2), triplets (L=3) and so forth should be produced as subsequences from which the test cases are constructed. The length may be any integer value, ranging from two to the maximum test case length, which the tester also specifies. An exhaustive test may be specified by having the subsequence length equal the maximum test case length, with appropriate other settings (e.g., no constraints).

As described below, with this input, the test case generation mechanism 206 outputs a set (or suite) of test sequences $208_1$ (e.g., to a medium such as a storage or transmission medium). This suite of test sequences $208_1$ generally has two properties, namely that all valid subsequences are covered (that is, will be tested in a test case) at least once, and that no test case violates any of the given constraints. As described below, these properties also apply when dealing with subsequences that are expected to fail, e.g., if an order of operations {B,A,C,D} is expected to fail because operation B should not happen before operation A, (which may be a valid test to see how software code handles such an occurrence), then there is a possibility that sequence pairings (A,C) and (C,D) may never be tested, unless they coincidentally also occur in another test case. As described below, the mechanism of the present invention provides a way to separate such test cases into separate test cases such that all valid sequences are tested.

In FIG. 2, the arrow labeled four (4) represents these test sequences $208_1$ being generated in accordance with various aspects of the present invention, and the dashed arrow between instances of the test sequences $208_1$ and $208_2$ representing the storage and/or transmission medium. Note that an error message is produced if any problem was encountered.

Thereafter, the instance of the test suite $208_2$ is used by the tester 202 or another (e.g., manually or as an input to an automation procedure) to exercise the test subsequences from the suite against the domain under test 200. Note that the tester 202 may vary the tests with factors other than those in the model/test sequences. For example, the tester 202 may run the test sequences on a machine when memory is plentiful, and a second time when memory is scarce. Additional parameters may be varied.

Figure 3:
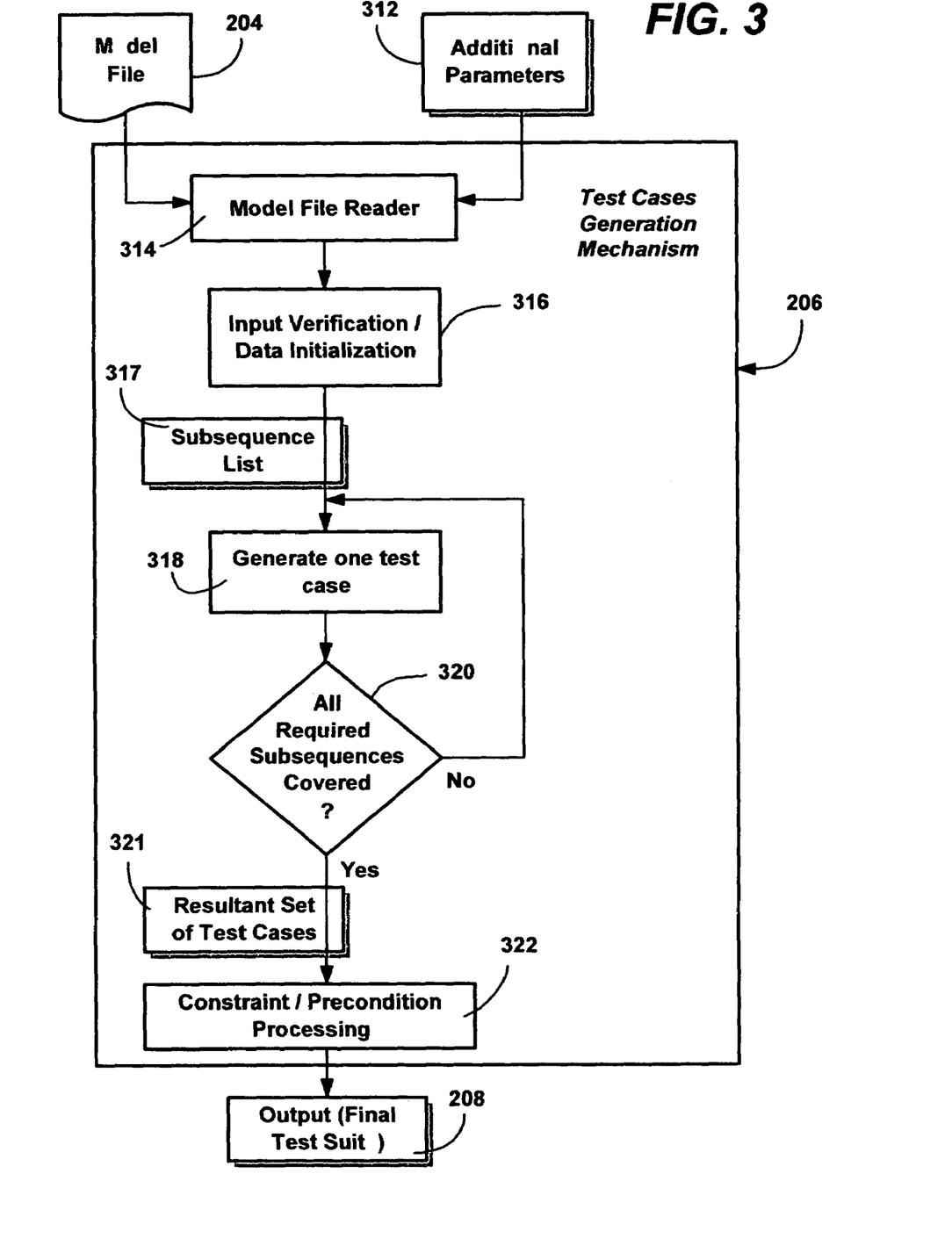
FIG. 3 is a block diagram generally representing the operation of components including those of a test cases generation mechanism that generates a test suite in accordance with an aspect of the present invention.

FIG. 3 is a representation of the general operation of the test cases generation mechanism 206. In general, the model file 204 (generally comprising the parameters and elements to test and any constraints), and any additional parameters 312 (such as comprising the subsequence length L, such as L=2 for pairs) are fed to a model file reader and constraints parser component 314 of the test cases generation mechanism 206. The data is then verified and initialized by a data initialization/input verification component 316. Input verification may include testing that the size of the set of elements (S) to be tested is at least two ($|S|>=2$), testing that the subsequence length (L) does not exceed the size of the set of elements ($L<=|S|$), testing that the maximum number of elements (M) in a test case is not greater than the size of the set of elements ($M<=|S|$) and is not less than the subsequence length ($M>=L$), and that if there is a set of constraints (C), size of each constraint (c) of the set is between zero and does not exceed the subsequence length (for each c in the set C, $0<|c|<=L$). Note that the test case generation mechanism may have defaults which are used unless the tester specifies otherwise, e.g., pairs may be the default subsequence length unless the tester specifies another value.

Data initialization essentially comprises creating the list of valid subsequences 317 that need to be covered. For example, if pairs are specified (L=2), the pairs are generated, with any invalid pairs removed, as specified in the constraints. Thus, if a test set was {A,B,C} with L=2 and no duplicates (or higher multiples) desired, and a constraint identifying (C,A) was specified as being invalid, the subsequence-pairs (A,B), (A,C), (B,A), (B,C), (C,A) and (C,B) would be generated. After that, the constraint is applied to remove (C,A) from the list of subsequences, leaving the pairings of (A,B), (A,C), (B,A), (B,C) and (CB) as the subsequences to be covered. Note that whether multiple instances of the same element are desired in a test case can be handled in part at this time, e.g., if consecutive duplicates are desired, (A,A), (B,B) and (C,C) would be valid subsequences. Not allowing such consecutive duplicates may be handled via constraints, although for convenience the tester may alternatively specify such options (e.g., duplicates not desired).

Components 318 and 320 represent a process within the test cases generation mechanism that generates test cases based on the subsequences in the list 317 until all required subsequences are covered in at least one test case. As represented by these components, the process repeats until all required combinations are covered, whereby output data in the form of resultant set of test cases 321 is provided. As described below, any other constraints and preconditions are applied to the resultant set of test cases 321 via constraint/precondition processing 322, producing the final test suite 208. Note that a constraint may not correspond to a subsequence; with the above example, BCA may be specified as invalid, however the initial data initialization only dealt-with pairs, and thus such constraints also need to be applied after the test cases are generated. Thus, any invalid combinations (e.g., of three or more parameters when pairs are being tested, or four or more when triplets are being tested) can be handled in a manner that makes sure that no invalid combination is tested. Also, a known error condition needs to be constrained so that no valid combination in the same test case remains untested, generally by splitting up a test case, as described below. Note that after generation of the final test suite 208, further processing may be done on the test suite 208, e.g., the sets of tests in the suite may be reordered so that faster tests can be run first and the results analyzed while slower tests are running, or processed for some other reason.

In general, and as described below with reference to FIG. 4-7, the algorithm operates by adding a subsequence (e.g., pairs as specified by the tester) to a test case, and then marking that subsequence as covered. The process continues building test cases until no subsequence remains that is not covered in at least one test case. For efficiency, the selected subsequence may be based on the most uncovered elements starting a subsequence among the remaining subsequences, with ties broken in a suitable fashion such as by choosing the first available, choosing randomly, or looking to a next elements' frequency of coverage. Note that other selection algorithms and/or tiebreakers may be alternatively employed.

Although most of the example herein are directed towards two element subsequences, it should be noted that the test case generation mechanism can be configured by the tester to cover three-element subsequences or larger, up to the maximum number of elements that a tester wants in a test case (which would correspond to exhaustive testing). For example, given the same set of four elements {A,B,C,D} with L=3, generation is similar to that described above, however this time the mechanism starts with three-element subsequences:

(A,B,C), (A,C,B), (B,A,C), (B,C,A), (C,A,B), (C,B,A)

(A,B,D), (A,D,B), (B,A,D), (B,D,A), (D,A,B), (D,B,A)

(A,C,D), (A,D,C), (C,A,D), (C,D,A), (D,A,C), (D,C,A)

(B,C,D), (B,D,C), (C,B,D), (C,D,B), (D,B,C), (D,C,B)

A test suite comprising the following four element test cases covering these subsequences is generated:

{A,B,C,D}{B,A,C,D}{C,A,D,B}{D,A,C,B}{C,B,A,D}{D,C,A,B}

{D,B,C,A}{C,B,D,A}{C,D,A,B}{D,C,B,A}{D,B,A,C}{A,C,D,B}

In this example, there are twelve test cases instead of the twenty-four that would be present in exhaustive testing.

Turning to an explanation of the operation of the test cases generation mechanism, with particular reference to the flow diagram of FIGS. 4-7, step 400 represents verifying the inputs of the model file, as generally described above. Steps 402 and 404 represent the data initialization phase, as also described above, namely generating the list of subsequences (step 402) and removing subsequences based on any constraints that can be applied to the subsequences on the list (step 404).

Figure 4:
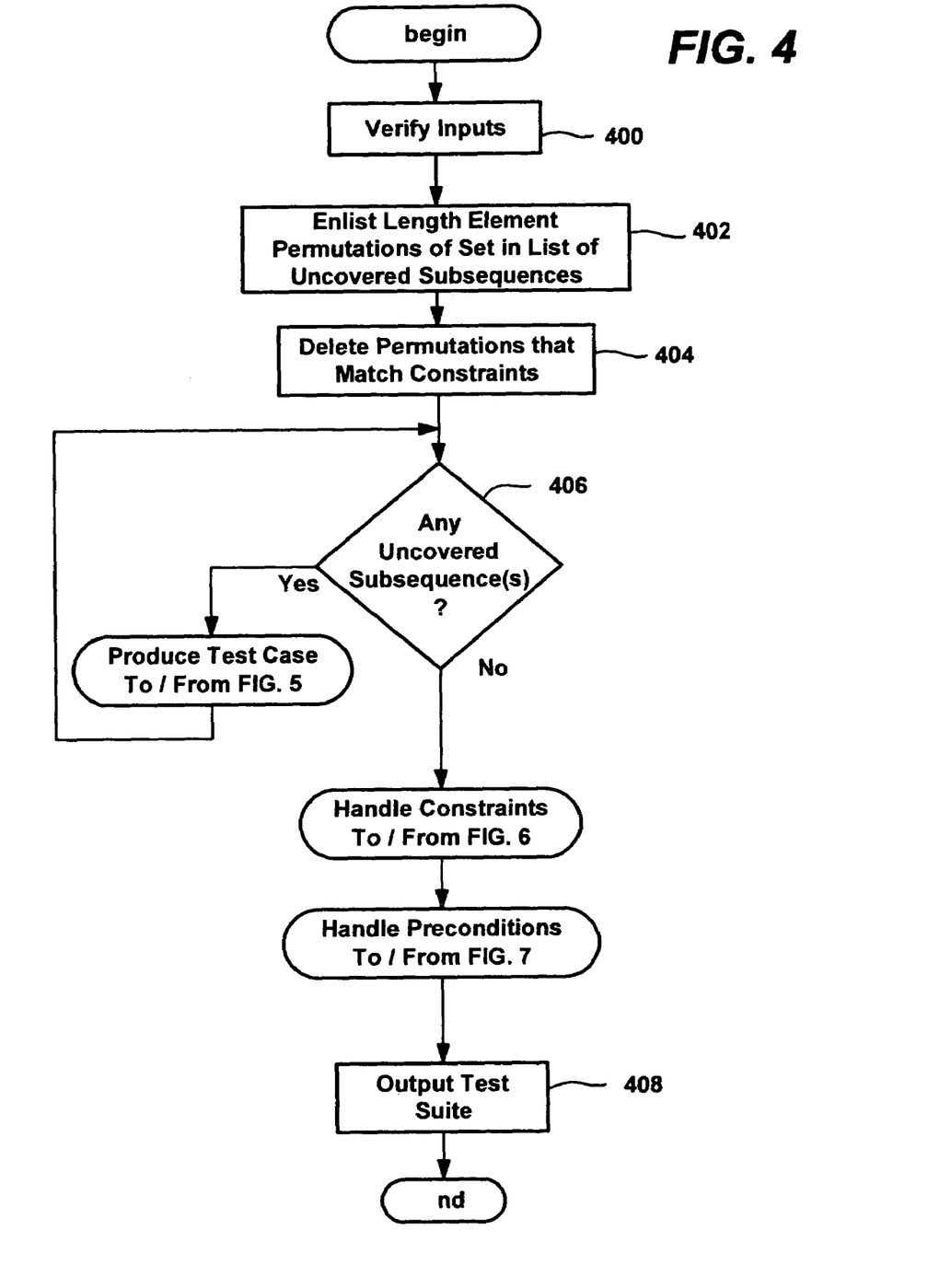
FIGS. 4-7 comprise a flow diagram generally representing processes in the test cases generation mechanism, in accordance with an aspect of the present invention.
Figure 5:
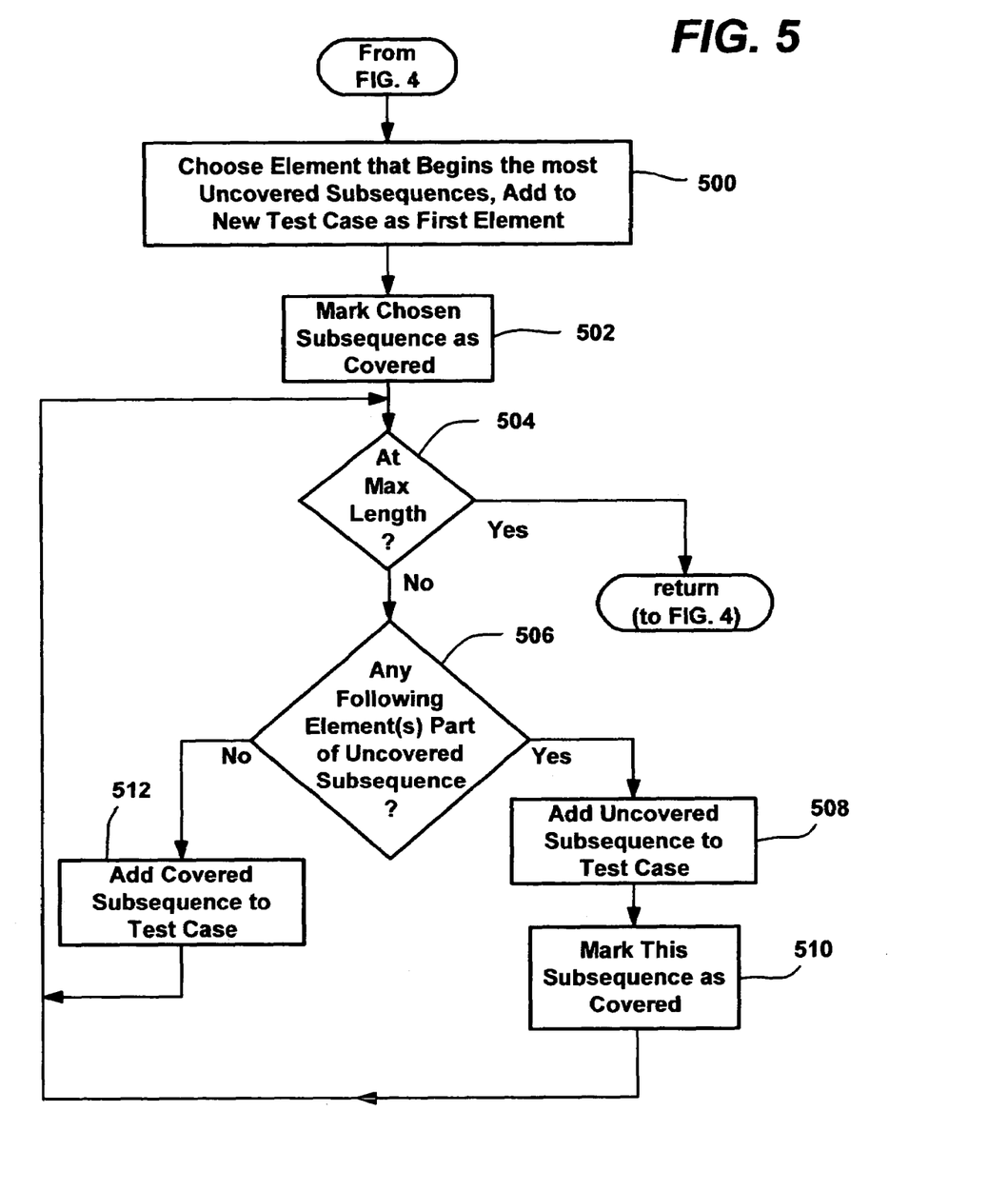

Step 406 represents a loop that continues generating test cases until each subsequence in the list is present in at least one test case. FIG. 5 represents the test case generation process, beginning at step 500 which starts a new test case by choosing an element based on a frequency count, corresponding to the element that begins the most uncovered subsequences, as described above. If this first subsequence fills the test case (subsequence length L=maximum length M), or if adding another subsequence would exceed the maximum length, step 504 returns to FIG. 4 where a new test case is started and generated until no subsequences remain uncovered.

If not at the maximum, step 504 branches to step 506 which represents looking for another subsequence to follow in the test case. The preference is to use another uncovered subsequence, represented by step 508, which is then marked as covered at step 510. Otherwise, a covered subsequence is reused at step 512.

By way of example, given the four elements A, B, C, and D above, {A,B,C,D}, with the subsequence length L=2 and the maximum test case length M=4, the pairings following step 404 would be (A,B), (B,A), (A,C), (C,A), (A,D), (D,A), (B,C), (C,B), (B,D), (D,B), (C,D) and (D,C). Assuming no subsequence is removed by a constraint, at the start, the number of elements that start the uncovered subsequences is the same, (four of each). Thus, if the tiebreaker is to select the uncovered first pair, then (A,B) is added to a test case {A,B,_,_} and marked as covered (steps 500 and 502, respectively). Since the maximum length is four, at least one other subsequence needs to be added, which needs to begin with element B, and if no duplicates are desired, cannot contain an A element. Step 506 branches to step 508, where the subsequence (B,C) would be added to this test case {A,B,C,_}, because (B,C) is the first uncovered subsequence in the list that starts with element B. Note that if multiple instances of the same element are desired in a test case, then any uncovered subsequence that starts with element B could be used, such as subsequence (B,A). Step 510 marks (B,C) as being covered. As the test case in this state is {A,B,C,_}, and adding another subsequence would not exceed the maximum length, the remaining subsequence to be added (without duplicating an element) starts with C and can only be (C,D), such that this test case is now length four and is complete {A,B,C,D}. The subsequence (C,D) is marked as covered at step 510, which returns to step 504. Because adding another subsequence to this test case would exceed the maximum length, step 504 now returns to step 406 of FIG. 4.

At step 406, since there are still uncovered subsequences remaining, (as only (A,B), (B,C) and (C,D) have been covered), another test case is built in the same manner by step 406 branching to step 500 of FIG. 5. This time, however, there are more D elements (four) that start uncovered subsequences than any other element, so (D,A) is chosen at step 500 to start the next test case, and the process continues as described above until no uncovered subsequences remain. Note that if necessary, if there are no uncovered subsequences that can be used to complete a test case, a covered subsequence is reused in a test case via step 512.

Figure 6:
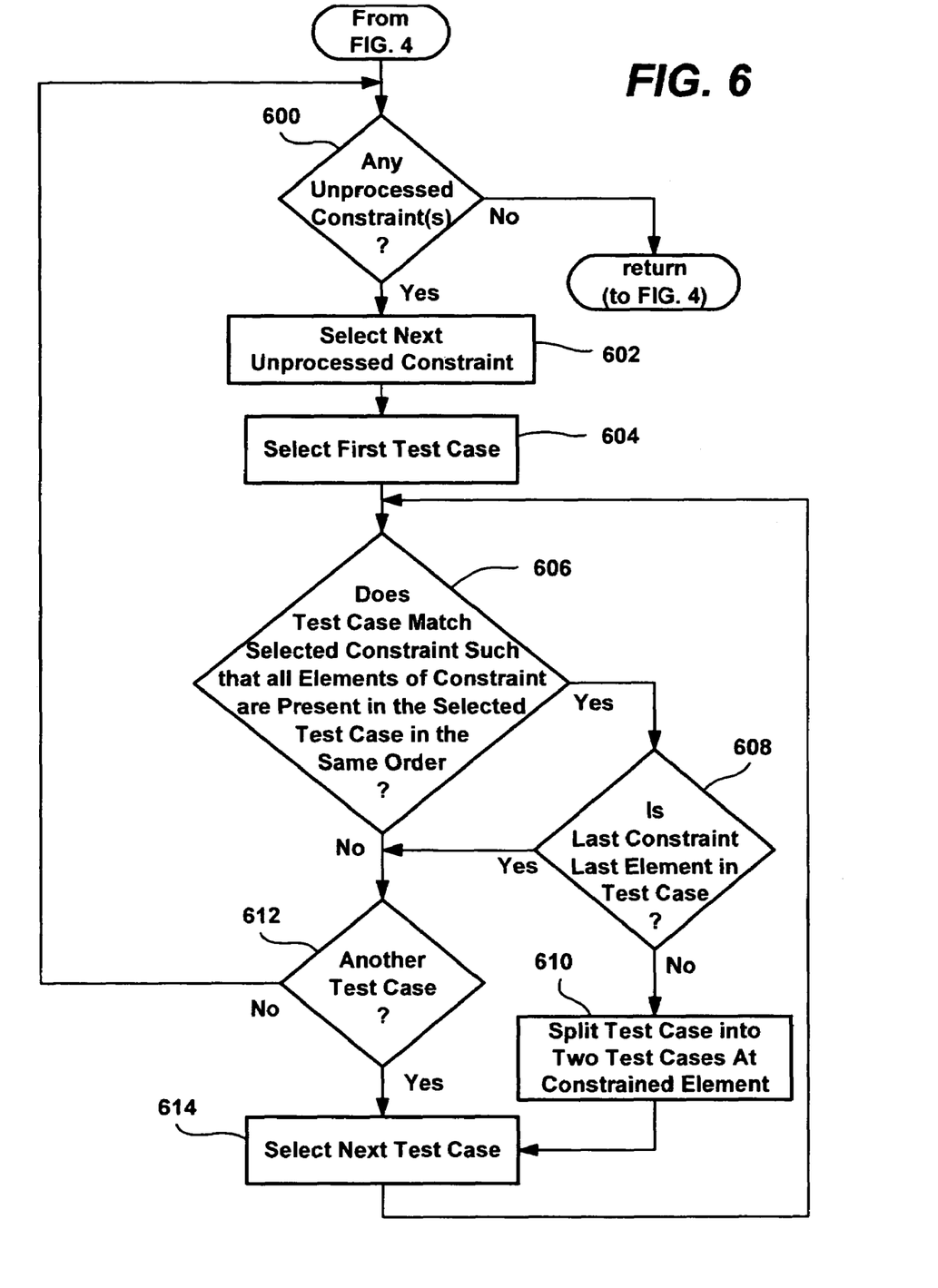

When there are no subsequences remaining uncovered, step 406 ends the loop and branches to step 600 of FIG. 6 to handle any constraints. This is of practical importance, because certain subsequences are expected to fail, and can cause other subsequences to not be tested. By way of example consider four operations, A, B, C, and D, such as installations of software packages, in which operation B cannot be performed after operation A because it always fails (which is expected). In this example, if unaccounted for, the test mechanism may generate a test case such as {A,D,B,C}, resulting in the following operations being executed:

1) Install A
2) Install D
3) Install B
4) Install C

Step 1 and 2 can be done, and step 3 fails as expected, which is still a valuable test. However, step 4, which is to test the (B,C) subsequence will not work, because step 4 assumes that B was already installed, which is not true because step 3 failed, and thus the "testing" of the subsequence (B,C) is not valid.

To solve this, the test cases generation mechanism rearranges the test cases based on constraints so that the test cases still cover the required subsequences without experiencing the incorrect interaction of elements. To this end, one solution is to ensure that operations that are expected to fail are always carried out last in a test case. A straightforward way to do this is to generate the test cases as described above, and then break any test case into two (or more) test cases if needed.

FIG. 6 describes how the test case generation mechanism performs this task. In general, each constraint is evaluated against each test case, as represented in the loops in FIG. 6, performed via steps 600, 602, 604, 612 and 614. Thus, for every constraint c in a set of constraints C, (where c is in a form of {ca cb ... cz}), for every test case r in a resultant set of test cases R, step 606 evaluates whether r matches c in such a way that the elements of c are present in r in the same order, and also that cz is not last element in r (step 608). If these conditions are met, the test case is split into two at step 610, according to the following rule: When an operation S will fail because of some preceding operation P, every time an S succeeds a P in a sequence in a test case, the test is split such that one test case ends at S and another starts with S. Note that the examples are for subsequences of length 2 (L=2), but can be easily extended for larger subsequences (L>2). Further, note that succession may not be direct, as the may be some elements in between P and S.

By way of example, consider the test case represented by elements A through Z below, where operation S fails when P precedes S. Applying the rule, the test case {A,B,C, ... ,P,R,S,T, ... ,X,Y,Z} becomes a test case {A,B,C, ... ,P,R,S} and another test case (S,T, ... ,X,Y,Z}.

In the above installation example, instead of test case {A,D,B,C}, the constraint processing produces two test cases {A,D,B} and {B,C}. Thus, the subsequences are properly tested. Note that in the flow diagram of FIG. 6, step 610 splits the test cases, and step 614 selects as the next test case the second of those split. This second test case may itself be split, if appropriate. In this way, a single test case can be broken into more than two test cases if the original test case matches more than one constraint.

Certain operations also have preconditions that need to be handled. For example, consider the following set of operations:

Format volume
Add drive letter
Remove drive letter
Show volume properties

A drive letter only can be added successfully to a formatted volume, and also the letter can be successfully removed only if it has been previously assigned. On the other hand, tests also should be performed that exercise those operations without the precondition being satisfied, thereby testing how the domain under test handles those events. The test cases generation mechanism handles both situations by applying the following rule:

If the constraint is Z→R and the test case is {A,B, ... ,P,R,S, ... ,X,Y,Z}, then two test cases are created, {A,B, ... ,P,R}, which tests without the precondition satisfied, and {Z,R,S, ... ,X,Y,Z}, which satisfies precondition and continues testing. In other words, for any test case that violates the precondition constraint, create a copy of the test case starting from the element at which the precondition is unsatisfied. Then add operations at the beginning of that test case to ensure that the precondition is satisfied. Remove any elements from the original test case that follow the element with the unsatisfied precondition, and execute both test cases.

Even though, the constraint here is of the simplest form of some element Z before element R, this method can be easily extrapolated onto constraints with more elements on both sides of the precondition. By way of example, consider the above set of operations, format volume (FmtVol), add drive letter (AddDl), remove drive letter (RemDl), and show volume properties (ShowPr). The resulting test suite, without considering any preconditions, may be generated as follows:

{FmtVol, AddDl, ShowPr, RemDl}          (1)

{RemDl, AddDl, FmtVol, ShowPr}          (2)

{RemDl, ShowPr, AddDl, FmtVol}          (3)

{RemDl, FmtVol, ShowPr, AddDl} (4)

{ShowPr, FmtVol, RemDl, AddDl} (5)

{AddDl, RemDl, ShowPr, FmtVol} (6)

The preconditions constraint are:

FmtVol before AddDl (FmtVol→AddDl)

AddDl before RemDl (AddDl→RemDl)

Of the test cases that were generated, all except test case (1) violate at least one constraint. Applying the above rule to each test case as appropriate results in the following set of test cases (with strikethroughs representing the removed operations due to the expected failure):

{FmtVol, AddDl, ShowPr, RemDl} (1)

{RemDl,} (2a)

{FmtVol, AddDl, RemDl, AddDl, FmtVol, ShowPr} (2b)

{RemDl,} (3a)

{FmtVol, AddDl, RemDl, ShowPr, AddDl, FmtVol} (3b)

{RemDl,} (4a)

{FmtVol, AddDl, RemDl, FmtVol, ShowPr, AddDl} (4b)

{ShowPr, FmtVol, RemDl,} (5a)

{, FmtVol, AddDl, RemDl, AddDl} (5b)

{AddDl,} (6a)

{FmtVol, AddDl, RemDl, ShowPr, FmtVol} (6b)

After removing duplicates, which is a straightforward task, the test suite is as follows:

{FmtVol, AddDl, ShowPr, RemDl}

{RemDl}

{FmtVol, AddDl, RemDl, AddDl, FmtVol, ShowPr}

{FmtVol, AddDl, RemDl, ShowPr, AddDl, FmtVol}

{FmtVol, AddDl, RemDl, FmtVol, ShowPr, AddDl}

{ShowPr, FmtVol, RemDl}

{FmtVol, AddDl, RemDl, AddDl}

{AddDl}

{FmtVol, AddDl, RemDl, ShowPr, FmtVol}

An additional consideration when applying multiple constraints is that there is a dependence order. Consider the same two preconditions as above:

FmtVol→AddDl (1)

AddDl→RemDl (2)

Precondition (1) is dependent on precondition (2). Thus, precondition (2) should be applied first, before precondition (1), otherwise the splitting rule may create more or longer test cases, with unnecessary steps, as in the following example test case:

{RemDl, FmtVol, ShowPr, AddDl}

After applying precondition (1), the following test cases result:

{RemDl, FmtVol, ShowPr, AddDl}

{FmtVol, AddDl}

After applying precondition (2):

{RemDl, FmtVol, ShowPr, AddDl}

{FmtVol, AddDl, RemDl, FmtVol, ShowPr, AddDl}

{FmtVol, AddDl}

If done with precondition (2) first and precondition (1) second, only two test cases result, (which is ordinarily more desirable):

{RemDl, FmtVol, ShowPr, AddDl}

{FmtVol, AddDl, RemDl, FmtVol, ShowPr, AddDl}

This is relatively straightforward, although for more complex scenarios, more sophisticated modeling tools may be employed, such as Finite State Machine based tools.

Figure 7:
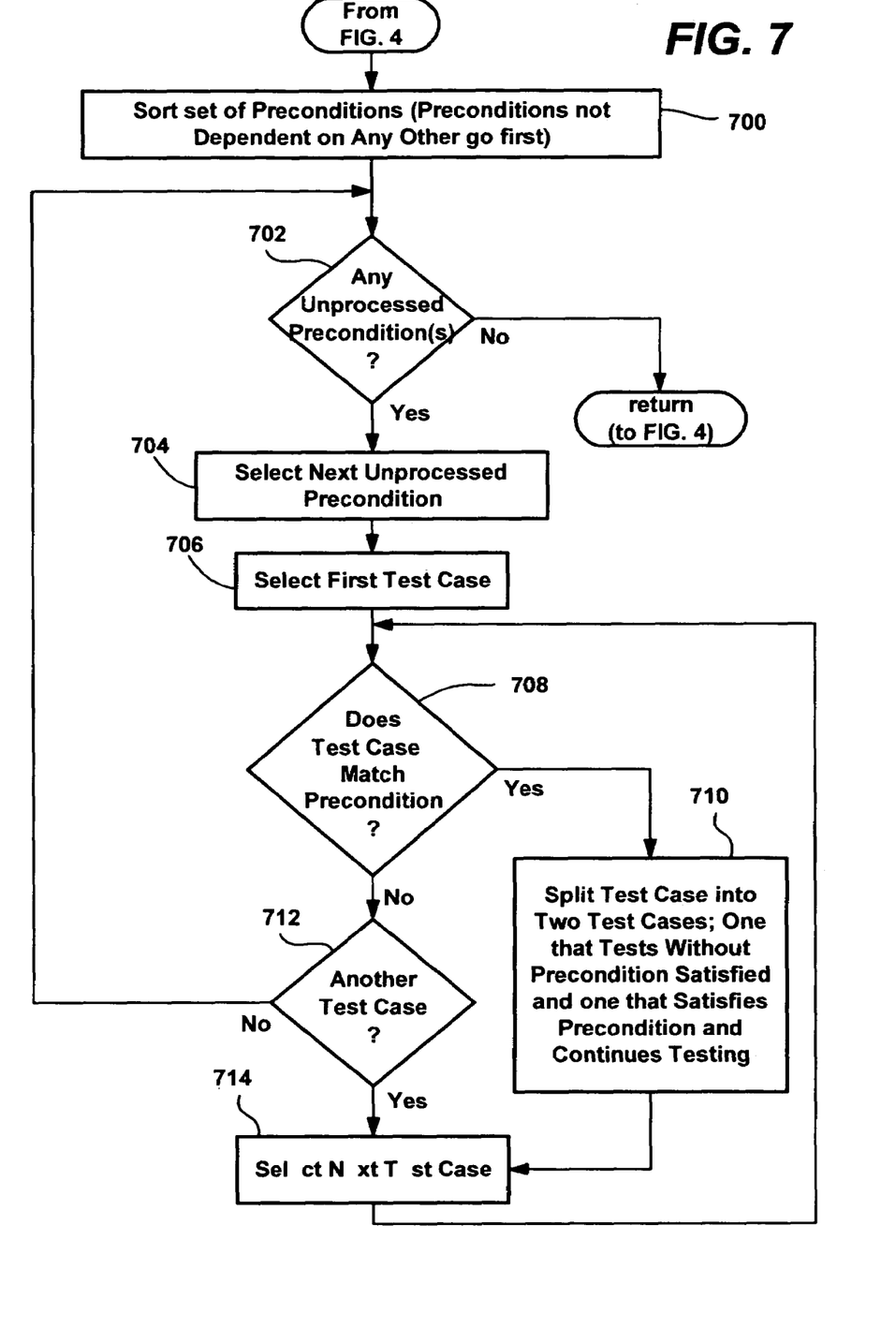

FIG. 7 is a flow diagram that generally shows how preconditions are handled in the above-described manner, beginning at step 700 with the sorting of preconditions based on dependency, as described above. Steps 702 and 704 repeat the process for each precondition, starting at step 706 with the first test case being selected. If at step 708 the selected test case matches a precondition, that test case is split at step 710 as described above. Note that step 710 splits the test cases, and step 714 selects as the next test case the second of those split. This second test case may itself be split, if appropriate. In this way, a single test case can be broken into more than two test cases if the original test case matches more than one precondition.

If the test case does not match a precondition, step 708 branches to step 712, which repeats the process for each test case via step 714 until none remain. When none remain, step 712 returns to step 702 to continue the process on the next unprocessed precondition until no preconditions remain unprocessed. When the preconditions have been processed, the test case generation mechanism returns to step 408 of FIG. 4 where the final test suite is output, such as to run the tests or to be stored for later usage.

The following provides a few example scenarios. Although these scenarios are generally related to software installations, it is understood that these can be easily extended to other test areas that require different orderings of computer-related operations to be tested.

Consider following real-world example: the installation of four hotfix packages that carry different binaries (thus can co-exist in any configuration), {A,B,C,D}. As described above, to cover all possible sequences of a four-element set, there would need to be twenty-four four-element sequences, which is ninety-six installations. Using the present invention, covering all two-element subsequences results in four or five four-element test cases, which is only sixteen or twenty installations. Although a significantly fewer number of installations are performed, the goal of verifying whether installation of any package right after any other package is handled correctly is achieved.

When installing hotfix packages that carry the same binary, the example becomes slightly more complex, although perfectly valid. Consider four hotfix packages in which two carry the same binary in different versions. Installing an older binary over a newer one typically does not replace it, but instead returns some sort of failure, and leaves the binary intact. To render test cases for this example, in which the packages are represented by the elements A, B, C1 and C2, the additional constraint is that C2 cannot be installed before C1, (~C2 C1, where. "~" indicates a constraint). Without considering this constraint, the test suite might be generated as below:

{A,B,C1,C2}  (1)

{B,C2,A,C1}  (2)

{C1,A,C2,B}  (3)

{C2,C1,B,A}  (4)

Test cases (1) and (3) will work because installation C2 is performed after C1. In test cases (2) and (4), C1 is installed after C2, so the latter installation of C1 will should fail. Note that test case (2) will work because C1 is the last installation in a sequence, and no other installation depends on having C1 files on the system. Conversely, test case (4) will not correctly test, because the installation of B is supposed to test a subsequence (C1,B), but because the installation of C1 will fail (the installer does not put older files on the system), what is instead actually checked is (C2,B). As described above, this problem is avoided by splitting test case (4) into two test cases:

{C2,C1}

{C1,B,A}

This leaves the following test suite, which achieves the goal of properly covering (C2,C1) and (C1,B):

{A,B,C1,C2}

{B,C2,A,C1}

{C1,A,C2,B}

{C2,C1}

{C1,B,A}

In some install scenarios, it may be important to test what will happen when one package is to be installed twice. This can be handled in the architecture of the present invention by creating an appropriate model. For example if set has three elements: A, B, and C, the tester may want to create three models:

A A B C

A B B C

A B C C

When the mechanism generates the output, the result, which (assuming no constraints or preconditions) corresponds to the final test suite that will be output, is:

{A,A,B,C}

{A,C,A,B}

{B,A,C,A}

{C,B,A,A}

{A,B,B,C}

{B,C,A,B}

{B,A,C,B}

{C,B,B,A}

{A,B,C,C}

{B,C,A,C}

{C,A,C,B}

{C,C,B,A}

As can be seen from the foregoing detailed description, there is provided a method and system for testing sequences of operations via test cases made of subsequences, thereby substantially reducing the number of tests needed to test computer operations. The method and system handle constraints and preconditions. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for determining sequences of elements of computer operations for inclusion in test cases, the method comprising:

receiving an original model of computer operations comprising a plurality of elements, the elements representing operations to test;

receiving as input an interger N, N being greater than or equal to 2, wherein N represents the length of subsequences of elements to be composed for test cases;

receiving as input an integer M representing the maximum length of a test case;

generating a list subsequences from the elements, each subsequence being of fixed length and comprising N elements, and the list comprising all possible subsequences of length N of elements within the model, such that every possible subsequence of elements of length N is represented within the list;

removing from the list of subsequences each subsequence having been designated as invalid in a predefined list of invalid subsequences; and generating a list of test cases by concatenating subsequences from the list of subsequences, wherein each test case comprises M elements, and such that each valid subsequence appears at least once within the list of test cases.

2. The method of claim 1 further comprising, evaluating a constraint against the test cases to determine for each test case whether that test case matches the constraint.

3. The method of claim 2 wherein the constraint matches a selected test case, and further comprising, splitting the test case into at least two test cases.

4. The method of claim 1 further comprising, evaluating a precondition against the test cases to determine for each test case whether that test case matches the precondition.

5. The method of claim 4 wherein the precondition matches a selected test case, a further comprising, splitting the test case into at least two test cases.

6. The method of claim 1 wherein a plurality of preconditions are known, and further comprising, sorting the preconditions into an order, and evaluating each precondition against the test cases based on the order to determine for each test case whether that test case matches the precondition.

7. The method of claim 1 wherein generating a list of test cases from the subsequences comprises selecting a subsequence based on a selection algorithm, and adding the selected subsequence to a test case.

8. The method of claim 7 further comprising, marking the selected subsequence as covered.

9. The method of claim 8 further comprising, selecting another subsequence from a set of uncovered subsequences, and adding the other subsequence to the test case.

10. The method of claim 8 wherein selecting a subsequence based on a selection algorithm comprises, determining which element starts a largest number of still uncovered subsequences, and selecting a subsequence starting with that element.

11. The method of claim 8 wherein selecting a subsequence based on a selection algorithm comprises, determining which element starts a largest number of still uncovered subsequences, and if there is only one such an element, selecting a subsequence starting with that element, and if there is a tie, employing a tiebreaker.

12. The method of claim 1 wherein generating a suite of test cases from the subsequences comprises selecting a subsequence, adding the selected subsequence to a test case, marking the selected subsequence as covered, and repeating until no subsequence remains uncovered.

13. A computing system comprising one or more computer processors and computer readable storage media and upon which is executing the method of claim 1.

14. The system of claim 13 further comprising, evaluation means for evaluating a constraint against the test cases to determine for each test case whether that test case matches the constraint, and if so, the evaluation means employing means for splitting that test case into at least two test cases.

15. The system of claim 13 further comprising, evaluation means for evaluating a precondition against the test cases to determine for each test case whether that test case matches the precondition, and if so, the evaluation means employing means for splitting that test case into at least two test cases.

16. The system of claims 13 wherein the method executing further comprises determining an element which starts a still most uncovered number of subsequences.

17. A computer program product comprising physical computer readable storage media upon which is encoded instructions which, when executed, perform the method of claim 1.

18. The computer program product system of claim 17 wherein the method further comprises evaluating a constraint against the test cases to determine for each test case whether that test case matches the constraint.

19. The computer program product of claim 17 wherein the method further comprises evaluating a precondition against the test cases to determine for each test case whether that test case matches the precondition.

20. The computer program product of claim 17 wherein the method further comprises sorting a set of preconditions into an order, and evaluating each precondition against the test cases based on the order to determine for each test case whether that test case matches the precondition.

21. The computer program product of claim 17 wherein, within the method, generating the list of test cases from the subsequences is based up selecting a subsequence based on a selection algorithm, and adding the selected subsequence to a test case.

22. The computer program product of claim 21 wherein, within the method, selecting a subsequence based on a selection algorithm comprises determining which element starts a largest number of still uncovered subsequences and selecting a subsequence starting with that element.

\* \* \* \* \*